United States Patent [19]

Lester

[11] Patent Number: 4,622,498
[45] Date of Patent: Nov. 11, 1986

[54] DYNAMIC FOCUS SYSTEM CASCODE AMPLIFIER

[75] Inventor: Theodore V. Lester, Schiller Park, Ill.

[73] Assignee: Motorola, Inc., Schaumburg, Ill.

[21] Appl. No.: 771,947

[22] Filed: Sep. 3, 1985

[51] Int. Cl.[4] .......................................... H01J 29/58
[52] U.S. Cl. .................................. 315/382; 330/156; 330/311
[58] Field of Search .................... 330/70, 71, 156, 311; 358/184; 315/382

[56] References Cited

U.S. PATENT DOCUMENTS

| 3,239,773 | 3/1966 | Kaufman | 330/70 X |
| 4,079,336 | 3/1978 | Gross | 330/296 |
| 4,214,188 | 7/1980 | Bafaro et al. | 315/382 |
| 4,230,972 | 10/1980 | Bafaro | 315/382 |
| 4,270,126 | 5/1981 | Bafaro | 340/748 |
| 4,473,780 | 9/1984 | Gent | 330/311 X |
| 4,484,147 | 11/1984 | Metz | 330/156 |

FOREIGN PATENT DOCUMENTS 2746745  4/1979  Fed. Rep. of Germany .

OTHER PUBLICATIONS

"Disc Preamp," Elektor, vol. 4, No. 7–8, Jul./Aug. 1978, pp. 7–71.
IBM Technical Disclosure Bulletin, G. E. Beers, vol. 22, No. 6, Nov. 1979.
Electronic Engineering, D. Ivekovic, Dec., 1967, p. 739.

Primary Examiner—James B. Mullins
Attorney, Agent, or Firm—Phillip H. Melamed

[57] ABSTRACT

Dynamic focus system utilizing an improved cascode amplifier is provided wherein the amplifier provides substantial voltage gain for a composite horizontal and vertical parabola signal and the output of the cascode amplifier is provided to the focus control electrode of a cathode ray tube. Undesired phase shift of the output of the cascode amplifier is prevented by AC coupling a signal corresponding to the noninverted input signal applied to the cascode amplifier to the base of the second transistor of the cascode amplifier.

10 Claims, 1 Drawing Figure

DYNAMIC FOCUS SYSTEM CASCODE AMPLIFIER

BACKGROUND OF THE INVENTION

The present invention is related to improved cascode amplifiers. More specifically, the present invention relates to a dynamic focus system for a cathode ray tube (CRT) which utilizes an improved cascode amplifier.

Typically in dynamic focus systems for CRTs, a variable amplitude voltage signal is provided at a focus electrode of the CRT. The desired variation of the focus voltage magnitude is a function of the position of the cathode ray tube electron beam with respect to the CRT screen. It is known that typically the desired variation of the focus voltage is defined by a parabola signal comprising a low frequency parabola envelope varying at the vertical sweep rate with a high frequency effective carrier signal varying at the horizontal sweep rate. U.S. Pat. Nos. 4,214,188 and 4,230,972, both assigned to the assignee of the present invention, generally discuss prior dynamic focus amplifier systems and the above noted parabola waveforms. These patents discuss providing a composite vertical and horizontal parabola signal by various techniques.

Typically a substantial voltage gain for the composite parabola signal is required so that a large peak magnitude variation for the focus voltage is achieved as the electron beam scans the CRT screen. An efficient way of implementing such a large voltage gain would be the use of a cascode amplifier with the lower (first) stage configured in a common emitter configuration, and the upper (second) stage configured in a common base configuration. One prior system which proposes such a configuration provides an AC ground path at the base of the upper transistor stage to insure the grounding of this base at the high horizontal sweep frequency. However, when substantial voltage gain is implemented by the cascode configuration and when a very large B+ voltage is utilized (thus requiring transistors with breakdown voltages able to withstand substantial reverse bias across their electrode terminals), it has been noticed that an undesirable phase shift occurs in the cascode amplifier configuration, especially when high horizontal sweep frequencies, such as 64 KHz, are utilized. For example, with a 64 KHz carrier (horizontal sweep) frequency and a 15 volt peak-to-peak variation in the input parabola signal, which resulted in a 500 volt peak-to-peak output parabola signal applied to the CRT focus voltage electrode, a 2 microsecond delay was noted. This has a detrimental affect since it results in the defocusing of the CRT electrode beam at the corners of the CRT screen since the focus voltage peaks will now not occur at the precise time at which the electron beam will reach the CRT screen corners. Utilizing a transistor having an improved frequency response for the upper transistor stage while still providing the desired reverse breakdown voltage capability was not feasible since transistors with such a combination of characteristics at a reasonable price were not available.

SUMMARY OF THE PRESENT INVENTION

An object of the present invention is to provide an improved cascode amplifier which overcomes the above noted deficiencies of the prior cascode amplifiers.

An additional object of the present invention is to provide an improved dynamic focus system which utilizes a cascode amplifier and which overcomes the above noted disadvantages of prior dynamic focus systems utilizing cascode amplifiers.

In one embodiment of the present invention a cascode amplifier is provided. The cascode amplifier comprises: first and second transistors, each having a control electrode and a pair of main current carrying electrodes forming a main current carrying path for each transistor, the main current carrying paths of each of said transistors connected in series and connected in series between first and second power supply terminals; an input terminal coupled to said control electrode of said first transistor, and an output terminal connected to one of said main current carrying electrodes of said second transistor, said first and second transistors forming a cascode amplifier means for together amplifying input signals applied at said input terminal and providing said amplified input signals as output signals at said output terminal; wherein the improvement comprises signal coupling means for coupling AC signals corresponding to noninverted AC input signals provided at the control electrode of said first transistor to the control electrode of said second transistor, whereby a smaller phase shift for said cascode amplifier means is achieved.

The present invention also provides a dynamic focus amplifier system which includes the above noted cascode amplifier wherein the output terminal of the cascode amplifier and the output signal present thereat are coupled to the focus electrode of a cathode ray tube. In the dynamic focus amplifier system the input signal at the input terminal comprises combined horizontal and vertical sweep parabola signal components which represents the desired focus voltage variations as a function of the cathode ray tube electron beam position.

In essence, the present invention has empirically found out that the undesirable phase shift discussed above for the cascode configuration when utilized in a dynamic focus system was due to a phase shift apparently attributable to the effect of the output current of the first transistor stage charging the base emitter capacitance of the second transistor stage through the base resistance of the second transistor stage. The solution proposed by the present invention is to effectively modify the base charge on the second transistor stage in accordance with the signal applied to the control electrode of first transistor stage. Preferably this is accomplished by capacitively coupling the emitter of the first transistor stage to the base of the second transistor stage. With this additional signal coupling, the above noted undesired phase shift was substantially eliminated such that no defocusing of the electron beam was apparent at the corners of the CRT screen when a 64 KHz horizontal sweep frequency was utilized. This same principle would appear to be applicable to any cascode amplifier required to implement high voltage gain wherein a slight phase shift between input and output is not desired.

BRIEF DESCRIPTION OF THE DRAWING

For a complete understanding of the present invention, reference should be made to the drawing in which.

DESCRIPTION OF THE PREFERRED EMBODIMENT OF THE INVENTION

Figure 1:
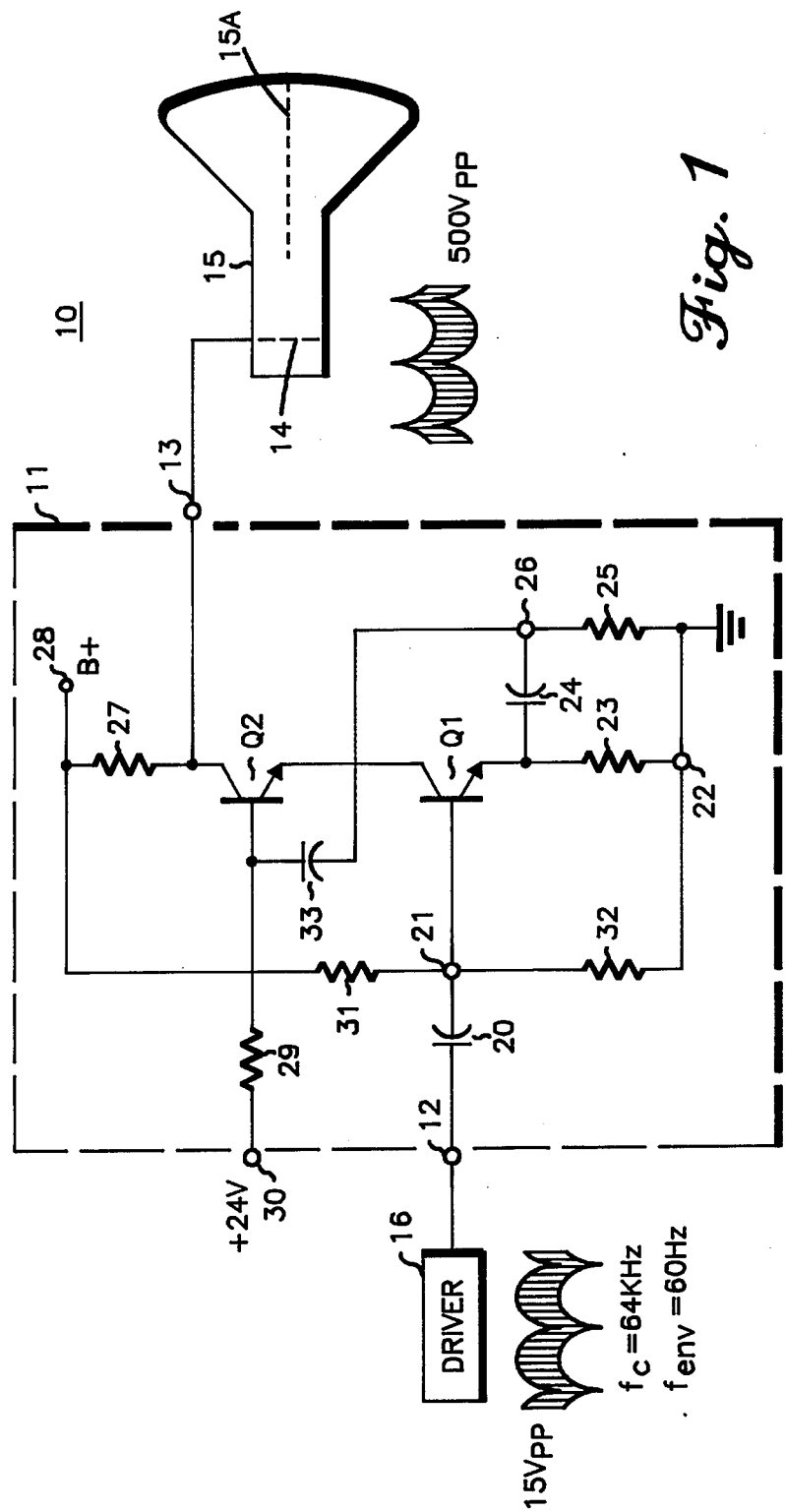
FIG. 1 comprises a schematic diagram of a dynamic focus system utilizing a cascode amplifier.

Referring to FIG. 1, a dynamic focus system 10 is illustrated. The system 10 basically comprises a cascode amplifier 11 (shown dashed) which receives a composite horizontal and vertical parabola signal at an input terminal 12 and provides, at an output terminal 13, a voltage amplified version of this same composite parabola signal. The output terminal 13 is directly connected to a focus control electrode 14 of a cathode ray tube 15. Driver circuitry 16 is illustrated in block form as providing the composite horizontal and vertical parabola signal at the terminal 12 wherein numerous known circuits can be utilized to provide the relatively low amplitude focus voltage signal at the terminal 12.

It should be noted that the focus voltage signal at the terminal 12 has a relatively small peak-to-peak magnitude variation, such as 15 volts peak-to-peak. The signal at terminal 12 essentially comprises an envelope signal varying at a 60 Hz vertical sweep rate for an electron beam 15A of the CRT 15 and an effective carrier frequency of 64 KHz corresponding to the horizontal sweep rate for the electron beam 15A. It should be noted that in conventional CRT display monitors a much lower horizontal sweep rate, such as 16 KHz, is utilized. At the typical low horizontal sweep rate of 16 KHz the above noted phase lag of the prior cascode amplifiers may not be apparent, but at higher horizontal sweep frequencies such as 64 KHz a detrimental phase shift was noted for cascode configurations that do not utilize the present invention. The present cascode amplifier 11 implements a substantial voltage gain without any detrimental phase shift such that the voltage at the output terminal 13 has a 500 volt peak-to-peak variation as opposed to the 15 volt peak-to-peak variation of the signal at input terminal 12. The preferred configuration for the cascode amplifier 11 will now be discussed in detail.

The parabola input signals at the terminal 12 are coupled through a one microfarad AC coupling capacitor 20 to a terminal 21. The terminal 21 essentially corresponds to the control electrode (the base) of a first NPN transistor Q1. The emitter of the transistor Q1 is coupled to a ground potential terminal 22 directly through a 2.7K (kilo ohm) resistor 23. In addition, a 0.0027 microfarad capacitor 24 and a 1.8K resistor 25 are connected in series with each other, and this series connection is connected in parallel with the resistor 23. The junction of the capacitor 24 and resistor 25 is at a terminal 26. The collector of the transistor Q1 is directly connected to the emitter of a second NPN transistor Q2 having its collector directly connected to the output terminal 13 and also connected through a 120K resistor 27 to a B+ terminal 28 at which a high voltage potential, such as 700 volts, is provided with respect to the ground potential terminal 22. The terminals 28 and 22 are generally designated power supply terminals for the cascode amplifier 11. Bias is supplied to the base of the transistor Q2 by a 1K resistor 29 connected between the base of the transistor Q2 and a bias terminal 30 at which a positive 24 volt potential is provided. Bias for the base of the transistor Q1 is provided by a 2 megohm resistor 31 connected between the terminals 28 and 21, and a 22K resistor 32 connected between the terminals 21 and 22. In some cases, for improved DC stability, resistor 31 could be provided between terminals 21 and 13. A 0.01 microfarad capacitor 33 is connected between the base of the transistor Q2 and the terminal 26, and this transistor provides a coupling of AC signals to the base of the transistor Q2 wherein these AC signals effectively allow the base circuit of the transistor Q2 to discharge more quickly and therefore eliminate the undesired phase shift noted above. More particularly, the capacitor 33 provides an AC coupling of signals to the base of the transistor Q2 wherein these signals correspond to noninverted AC input signals provided at the control electrode (terminal 21) of the first transistor Q1. For transistor Q2 a 2SD594 transistor from Sanken was used, and for Q1 a 2N4400 type transistor from Motorola was used. All of components 20–33 comprise the preferred configuration for the cascode amplifier 11 shown in FIG. 1.

In operation, the cascode amplifier 11 utilizes the first transistor Q1 in a common emitter configuration to provide an inverting voltage gain for the input signals at the terminal 21, wherein the output of the transistor Q1 is provided at its collector. The resistor 23 is utilized for DC biasing purposes while the capacitor 24 and resistor 25 are utilized to insure that a level frequency response gain is obtained. This is achieved by compensating for lower circuit gain at higher frequencies by reducing the Q1 emitter resistance at higher frequencies.

The transistor Q2 essentially operates as a common base amplifier which receives the signal at the collector of the transistor Q1 as an input at its emitter terminal. Then a noninverting output is provided at the collector terminal of the transistor Q2. However, the present invention also provides for the capacitor 33 AC coupling some of the noninverted signals at the terminal 26 to the base of the transistor Q2. This effectively aids the transistor Q2 in discharging its base circuit in the proper phase relationship so as to eliminate any undesired phase lag between the base and emitter signals of the transistor Q2. The end result is that the output signal at the terminal 13 has no appreciable phase lag with respect to the input signal at the terminal 12, except, of course, for the 180° phase reversal due to the phase inversion caused by the transistor Q1. This allows the present invention to implement a high voltage gain for the cascode amplifier 11 while providing no undesired phase shift even in view of the fact that a 64 KHz horizontal sweep frequency is a component of the signal being amplified by the combined action of the transistors Q1 and Q2.

It should be noted that the transistors Q1 and Q2 are connected in a cascode configuration wherein the collector and emitter terminals of each of these transistors essentially defined the main current carrying path of each of the transistors. The main current carrying paths of each of the transistors Q1 and Q2 are connected in series, and this series connection of these paths is also connected in series between the power supply terminals 28 and 22 so as to minimize the amount of current utilized by the cascode amplifier 11 while implemented the desired large voltage gain.

While the present invention has illustrated a capacitive coupling of an AC signal to the base of transistor Q2 to assist this transistor in rapidly discharging its base circuit at the proper time, other types of AC coupling could possibly be utilized, such as a noninverting connection between the signal at the terminal 21 and the base of the transistor Q2, or an inverting amplifying connection between the collector of the transistor Q1 and the base of the transistor Q2. In addition, coupling other than capacitive coupling between the emitter of transistor Q1 and the base of the transistor Q2 could be utilized.

While specific embodiments of the present invention have been shown and described, further modifications and improvements will occur to those skilled in the art.

All such modifications which retain the basic underlying principles disclosed and claimed herein are within the scope of this invention.

I claim:

1. A dynamic focus amplifier system comprising:

a cascode amplifier including first and second transistors, each having a control electrode and a pair of main current carrying electrodes forming a main current carrying path for each transistor, the main current carrying paths of each of said transistors connected in series and connected in series between first and second power supply terminals;

an input terminal coupled to said control electrode of said first transistor, and an output terminal connected to one of said main current carrying electrodes of said second transistor, said first and second transistors forming a cascode amplifier means for together amplifying input signals having frequencies substantially above 16 KHz applied at said input terminal and providing said amplified input signals as high voltage peak-to-peak output signals at said output terminal;

means directly coupling said output terminal and said output signals to a focus electrode of a cathode ray tube;

wherein the improvement comprises signal coupling means for coupling AC signals corresponding to noninverting AC input signals provided at the control electrode of said first transistor to the control electrode of said second transistor, whereby a smaller phase shift for said cascode amplifier means is achieved.

2. A dynamic focus amplifier system according to claim 1 which includes means for providing as said input signals at said input terminal signals comprising combined horizontal and vertical sweep parabola signal components representative of desired focus voltage variations as a function of the position of the cathode ray tube electron beam.

3. A dynamic focus amplifier system according to claim 2 wherein said control electrodes comprise base electrodes and said main current carrying electrodes of each transistor comprise collector and emitter electrodes.

4. A dynamic focus amplifier system according to claim 3 wherein said collector of said first transistor is coupled to said emitter of said second transistor, and wherein amplified and inverted input signals present at the base of said first transistor are provided as a signal input to the emitter of said second transistor, said output terminal being connected to the collector of said second transistor.

5. A dynamic focus amplifier system according to claim 4 wherein said signal coupling means comprises a signal path for input signals amplified by said first transistor, said signal path provided between the emitter of said transistor and the base of said second transistor.

6. A dynamic focus amplifier system according to claim 5 wherein said signal coupling means comprises a capacitor coupled between the emitter of said first transistor and the base of said second transistor.

7. A dynamic focus amplifier system according to claim 6 which includes a resistive load connected in series with the main current carrying path of said second transistor and coupled in series between said second transistor collector and one of said power supply terminals.

8. A dynamic focus amplifier system according to claim 7 which includes a resistor connected in series with the main current carrying path of said first transistor and coupled in series between said first transistor emitter and one of said power supply terminals.

9. A dynamic focus amplifier system according to claim 8 which includes a series connected resistor and capacitor connected in parallel with said resistor coupled between the first transistor emitter and said one of said power supply terminals.

10. A dynamic focus amplifier system according to claim 9 which includes bias means coupled to said first and second transistors for supplying DC operating bias to said first and second transistor control electrodes.

* * * * *